Sept. 29, 1959  F. C. HANSCOM  2,906,286
SAFETY VALVE
Filed April 1, 1957

INVENTOR.
FLOYD C. HANSCOM
BY
Williamson, Schroeder, Adams & Meyers
ATTORNEYS

United States Patent Office 2,906,286
Patented Sept. 29, 1959

2,906,286

SAFETY VALVE

Floyd C. Hanscom, Faribault, Minn.

Application April 1, 1957, Serial No. 649,755

6 Claims. (Cl. 137—460)

This invention relates to safety valves and more particularly to valves of the type which are adapted to close a fluid flow line in response to a break therein.

It is common practice to interconnect the rigid brake fluid lines on the frame of an automobile to the flow lines or brake cylinders on the axles or wheel drum by means of a flexible hose. After the automobile or vehicle has been in use for a substantial period of time, these hoses will occasionally break, and all of the brake fluid will be drained from the system which results in failure of the hydraulic brake system. I have found that by employing the valve, comprising the present invention, in the fluid flow line at a position between the master cylinder and the flexible rubber hose, the breakage of a hose will cause failure of the brakes at only one wheel (or possibly two wheels at the rear) of the vehicle.

An object of my invention is to provide a new and improved safety shut-off valve which operates in response to fluid flowing therethrough as a result of a break in the fluid flow line.

Another object of my invention is to provide a novel fluid flow shut-off valve which permits normal restricted flow therethrough and operates in response to a sudden fluid pressure differential thereacross due to such causes as a break in the flow line.

A further object of my invention is the provision of a novel fluid pressure operated safety valve, the operation of which is commenced by a fluid pressure differential thereacross and is then finished by spring means.

These and other objects and advantages of my invention will more fully appear from the following description made in connection with the accompanying drawings wherein like reference characters refer to the same parts throughout the several views and in which.

Figure 1:
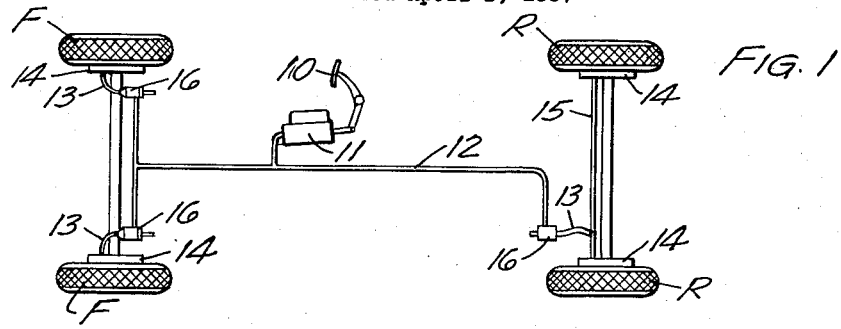
Fig. 1 is a diagrammatic sketch of the brake system of a conventional motor vehicle.

One form of the present invention is shown in the accompanying drawings and is described herein. The braking system as shown in Fig. 1 includes a brake pedal 10 connected for operating the master cylinder 11 which regulates the fluid pressure in the rigid fluid flow line 12 and which supplies brake fluid through the hose connections 13 to the brake cylinders 14 at each of the wheels. It should be noted that an individual hose 13 is provided at each of the front wheels F because of the conventional individual suspension of each of the front wheels whereas only a single hose connection 13 is necessary to supply brake fluid to the manifold pipe 15 on the rear axle for carrying fluid to the cylinders of the rear wheels R.

Figure 2:
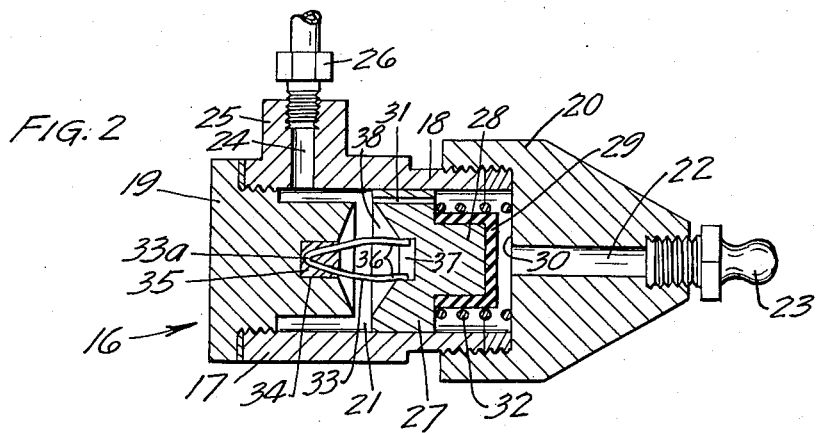
Fig. 2 is a longitudinal section view of the valve comprising the present invention.
Figure 3:
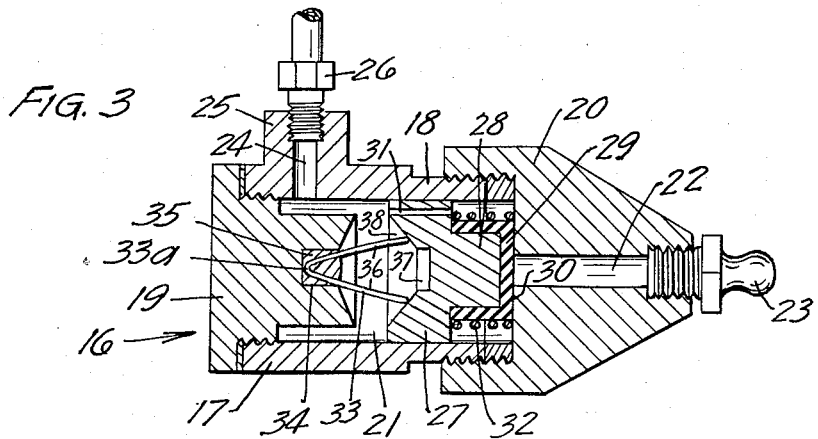
Fig. 3 is a view substantially similar to Fig. 2, but showing the valve element in shifted position.

It should also be noted that a safety valve 16 is disposed at the end of each portion of the rigid flow line 12, at the point of connection with the hose 13. The valve 16 is shown in detail in Figs. 2 and 3 and comprises a body structure which is indicated in general by numeral 17 and includes a substantially cylindrical central housing portion 18 having a rear closure 19 threadably secured thereto, and also having a front end closure 20 also threadably secured thereto. Of course suitable gasket means are provided to seal the interior chamber 21 of the body structure. An outlet or discharge passage 22 is provided in the forward end closure 20 and a hose-receiving nipple 23 may be secured therein to facilitate attachment thereof to a hose 13. An inlet 24 is provided through the central housing portion 18 and through a boss 25 to facilitate threaded attachment of the conduit fitting 26 thereto.

The valve 16 is provided with a shiftable valve element or plunger 27 in the chamber 21 and having a reduced cylindrical forward end portion 28 upon which is mounted a gasket cap 29 constructed of rubber or the like, which seats against the valve-seating portion 30 which surrounds the outlet opening 22 in the forward enclosure. The valve element or piston 27 is provided with a restricted flow passage 31 extending longitudinally therethrough for providing communication between the inlet 24 and the outlet 22. The flow capacity of the passage 31 should be sufficient as to easily carry the normal flow of brake fluid supplied from the master cylinder 11 to the several brake cylinders 14.

Means are provided for controlling the position of valve element 27 in the chamber 21 and in the form shown, such means include a coil compression spring 32 which surrounds the forward end portion 28 of valve element 27 and bears against the forward end of the chamber and against the valve element for normally maintaining the valve element in spaced relation with the valve seat 30.

Such means also includes a valve-controlling device indicated in general by numeral 33 which comprises a length of spring wire bent back upon itself in a substantially U-shaped configuration and having the central curved portion 33a thereof projecting into a bore 34 on the inner end of rear end closure 19. The valve-controlling spring device 33 is affixed in the bore 34 by any suitable means, and in the form shown, is secured by means of a quantity of lead 35 poured into the bore 34 as the spring device 33 is positioned. The outer end portions 36 of the spring device are normally urged outwardly into the position shown in Fig. 3. The outer end portions 36 of the spring device 33 bear against and frictionally engage a longitudinally extending cylindrical surface 37 in the rear end of the valve element 27. The opposite ends 36 effectively grip the cylindrical surface 37 and restrict longitudinal movement of the valve element 27. The valve element 27 also has a rearwardly extending and outwardly flared conical surface 38 which is disposed obliquely in respect to the cylindrical surface 37 and which connects with the rear end of the surface 37.

In normal operation, brake fluid is passed through the valve 16 from the inlet 24 to the outlet 22 thereof when the brake is depressed, and in a similar fashion, brake fluid will flow rearwardly through the discharge and then to the inlet 24 when the fluid pressure on the brake cylinder 14 is released.

In normal operation the plunger 27 will oscillate forwardly and rearwardly under the influence of brake pressure differential across the valve element 27. The brake fluid will lubricate the valve element 27 around its periphery at the point of engagement with the wall of housing 17. The ends of the spring 33 are free to slide along the cylindrical surface 37 so as to permit free sliding of the valve element. It should be understood however, that the spring 32 will, under normal operation, prevent the valve element 27 from moving forwardly from a degree sufficient to permit the ends of the spring 33 from sliding onto the conical or tapered wall 38. Of course with normal operation of the valve, the slight pressure differential created across the valve element 27 will cause brake fluid to flow through the bleeder opening 31.

It should be understood that the magnitude of normal movement of the piston 27 may vary in relation to the quantity of brake fluid that necessarily flows to operate the brake cylinders at the wheels. Therefore it will be seen that if a large quantity of brake fluid must be moved during each operation of the brakes, the cylindrical wall or surface 37 may necessarily be somewhat longer so as to deepen the cup defined thereby. Deepening of this cup will permit a greater magnitude of shifting movement of the valve element 27 without causing the spring 33 to slide onto the conical surface 38.

If a break were to occur in one of the hoses 13, it is likely that this would occur when the relatively high fluid pressure is being applied to the brake cylinders 14 and therefore the fluid pressure in the line 12 will be quite high. When the break occurs in one of the hoses 13, the fluid pressure at the discharge 22 of the valve 16 will immediately decrease very substantially, and as a result, a very substantial pressure differential will be established between the inlet 24 and the outlet 22, and across the valve element 27. Of course the flow through the passage 31 will momentarily increase but the primary effect will be that the high pressure, bearing against the rear side of valve element 27, will cause the valve element to shift forwardly toward the valve seat 30. As the valve element 27 shifts forwardly, the cylindrical surface 37 slides along the outer ends 36 of the valve-controlling spring 33 and the ends 36 will then engage the outwardly flared conical surface 38. When this occurs, the ends 36 of the spring device 33 will immediately spring outwardly and move along the outwardly flared conical surface 38 causing the valve element 27 to be positively driven in a forward direction to cause a sealing relation to be established between the rubber cap 29 and the valve seat 30.

The spring device 33 will maintain the valve element 27 under pressure to positively hold the valve element in sealing engagement with the valve seat until the hose 13 is fixed and the valve 16 is reset. In the reseating of the valve 16, the forward closure 20 may be removed and the valve element 27 will be rotated and urged rearwardly toward the rear closure 19. As this is done, the ends 36 of the spring device 33 move inwardly along the conical surface 38 and will subsequently slip into position on the cylindrical surface 37 and in frictional relation thereto.

It should be understood that the valve element 27 may oscillate slightly under the influence of rather small pressure differentials thereacross without causing the spring device 33 to trip and urge the valve element 27 ahead. These rather small longitudinal oscillations occur with flow of the brake fluid through the valve and permit quick application of fluid pressure to the brake cylinder 14.

It will be seen that I have provided a new and improved safety shut-off valve applicable into a fluid flow line for detecting a break in the flow line and causing the fluid pressure differential created between the inlet and outlet of the valve to trigger the valve-controlling spring device which positively urges the valve to closed position and holds the valve in closed position until reset.

It will, of course, be understood that various changes may be made in the form, details, arrangement and proportions of the various parts without departing from the scope of my invention.

What I claim is:

1. A fluid flow shut-off valve applicable into a flow line, said valve comprising a body structure defining an elongated interior chamber with a forward end communicating with an outlet, and a rear end communicating with an inlet, a valve seat surrounding the outlet, a valve element spaced from the valve seat and longitudinally movable through a first distance in the chamber into sealing engagement with the valve seat, said valve element defining a restricted flow passage between the inlet and outlet to allow normal flow of fluid in the flow line, said valve element having a longitudinal surface adjacent the rear end thereof and also having a rearwardly extending oblique surface connected with the rear end of the longitudinal surface, a valve-controlling device on the body structure and having an engaging portion bearing against and frictionally engaging said longitudinal surface at a position spaced from the intersection of the longitudinal surface and the oblique surface by a second distance which is less than said first distance, said device also having a resilient portion urging the engaging portion transversely against the longitudinal surface whereby to restrict longitudinal movement of the valve element, and said resilient portion also urging the engaging portion transversely of the valve element and along the oblique surface when the valve element has moved through said distance under influence of pressure differential thereacross for forcibly moving the valve element forwardly against the seat.

2. The invention as set forth in claim 1 and including a spring bearing against the valve element and body structure and urging the valve element away from the valve seat, whereby to permit limited pressure differentials across the valve element and limited longitudinal oscillation of the valve element without causing the oblique surface to move into engagement with the engaging portion of the controlling device.

3. A fluid flow shut-off valve applicable into a flow line, said valve comprising a body structure defining an elongated interior chamber with a forward end communicating with an outlet and a rear end communicating with an inlet, a valve seat surrounding the outlet, a valve element spaced from the valve seat and longitudinally movable through a first distance in the chamber into sealing engagement with the valve seat, said valve element defining a restricted flow passage between the inlet and outlet, a two-part valve-controlling mechanism, one part secured to the rear side of the valve element and the other part being secured to the body structure, one of said parts including a surface extending longitudinally of the chamber and an oblique surface having one end connected with the longitudinal surface and extending therefrom generally toward the other of the parts, the other of said parts including a valve-controlling device having a movable surface-engaging portion bearing against and frictionally engaging said longitudinal surface at a position spaced from the intersection of the longitudinal surface and the oblique surface by a second distance which is less than said first distance also having a resilient portion urging the engaging portion transversely against the longitudinal surface and also urging the engaging portion along said oblique surface when the valve element is shifted through said first distance under the influence of a pressure differential thereacross and forcibly moving the valve element forwardly against the seat.

4. The invention set forth in claim 3 wherein said first mentioned surface-defining part is of substantially annular construction with a cylindrically shaped longitudinal surface and a conically shaped oblique surface, and the second of the parts having a plurality of valve-controlling devices engaging the cylindrical surface at spaced portions about the circumference thereof.

5. A fluid flow shut-off valve applicable into a flow line, said valve comprising a body structure defining an elongated interior chamber with a forward end communicating with an outlet and a rear end communicating with an inlet, a valve seat surrounding the outlet, a valve element spaced from the valve seat and longitudinally movable through a first distance in the chamber into sealing engagement with the valve seat, the valve element defining a restricted flow passage between the inlet and outlet to permit normal fluid flow in the flow line, the valve element having at the rear side thereof a pair of opposed and longitudinally extending surface portions and also having a pair of oblique surface portions each connected at one end with a respective longitudinal surface portion and each extending diagonally outwardly and rearwardly therefrom, a substantially U-shaped spring member having the opposite ends thereof bearing against the opposed longitudinal surface portions at a position spaced from the intersection of the longitudinal surface and the oblique surface by a second distance which is less than said first distance swingable outwardly against the oblique surface portions when the valve element is shifted through said first distance forwardly under influence of a pressure differential and forcibly moving the valve element toward the valve seat.

6. A fluid flow shut-off valve applicable into a flow line, said valve defining a body structure defining an elongated interior chamber with a forward end communicating with an outlet and a rear end communicating with an inlet, a valve seat surrounding the outlet, said valve element spaced from the valve seat and longitudinally movable through a first distance in the chamber into sealing engagement with the valve seat, said valve element defining a restricted flow passage between the inlet and outlet to allow normal flow of fluid in the flow line, a two-part valve-controlling mechanism, one part secured to the rear side of the valve element and the other part being secured to the body structure, one of said parts including an elongated valve-controlling device projecting toward the other of the parts and having a movable, transversely facing surface-engaging portion and also having a resilient portion urging the engaging portion in a transverse direction, and the other of said parts including a surface portion frictionally engaging at a certain position said engaging portion of the device and arranged to normally restrain movement of the valve element under the influence of the resiliently urged engaging portion, and the other of said parts also including an oblique camming surface adjacent the elongated valve-controlling device and at a position spaced from said certain position a second distance which is less than said first distance, said camming surface being engageable with said engaging portion when the valve element is shifted through said first distance under the influence of pressure differential between the inlet and outlet, and constructed to permit said engaging portion to move therealong and positively drive the valve element toward and into sealing engagement with the valve seat.

References Cited in the file of this patent

UNITED STATES PATENTS

| | | |
|---|---|---|
| 2,093,015 | Madden | Sept. 14, 1937 |
| 2,357,321 | Fuller | Sept. 5, 1944 |
| 2,515,516 | Kalen et al. | July 18, 1950 |